US007076584B2

(12) United States Patent
Deur et al.

(10) Patent No.: US 7,076,584 B2
(45) Date of Patent: Jul. 11, 2006

(54) METHOD AND APPARATUS FOR INTERCONNECTING PORTIONS OF CIRCUITRY WITHIN A DATA PROCESSING SYSTEM

(75) Inventors: Michael W. Deur, Leander, TX (US); David Hayner, Austin, TX (US); Donald Louis Tietjen, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 419 days.

(21) Appl. No.: 10/435,188

(22) Filed: May 9, 2003

(65) Prior Publication Data

US 2004/0225862 A1    Nov. 11, 2004

(51) Int. Cl.
  G06F 13/36    (2006.01)
  G06F 12/10    (2006.01)
  G06F 15/16    (2006.01)

(52) U.S. Cl. .................. 710/110; 711/220; 709/211; 710/310

(58) Field of Classification Search ................ 709/211; 710/110
  See application file for complete search history.

(56) References Cited

U.S. PATENT DOCUMENTS

| | | | | |
|---|---|---|---|---|
| 4,368,514 A | * | 1/1983 | Persaud et al. | 709/211 |
| 4,700,292 A | * | 10/1987 | Campanini | 709/211 |
| 4,752,870 A | * | 6/1988 | Matsumura | 709/222 |
| 5,109,490 A | * | 4/1992 | Arimilli et al. | 710/110 |
| 5,218,681 A | | 6/1993 | Gephardt | |
| 5,353,415 A | * | 10/1994 | Wolford et al. | 710/310 |
| 5,541,853 A | | 7/1996 | Croft | |
| 5,734,843 A | | 3/1998 | Gephardt | |
| 5,790,801 A | * | 8/1998 | Funato | 709/229 |
| 6,038,259 A | | 3/2000 | Nanya | |
| 6,079,010 A | | 6/2000 | D'Arcy | |
| 6,112,229 A | * | 8/2000 | Hardy et al. | 709/206 |
| 6,122,690 A | * | 9/2000 | Nannetti et al. | 710/311 |
| 6,247,046 B1 | * | 6/2001 | Yanai et al. | 709/211 |
| 6,425,068 B1 | | 7/2002 | Vorbach | |
| 2005/0033951 A1 | * | 2/2005 | Madter et al. | 713/2 |

* cited by examiner

Primary Examiner—Rehana Perveen
Assistant Examiner—Jeremy S. Cerullo
(74) Attorney, Agent, or Firm—Susan C. Hill; Joanna G. Chiu

(57) ABSTRACT

A method and apparatus for interconnecting circuit portions (12, 14, 16, 18, 20) within a data processing system (10) using a master/slave interfaces (30–37, 134) which may be configured by way of configuration registers (21–28, 156, 100). External address generation circuitry (140) and internal address generation circuitry (142) may be used to generate externally used addresses and internally used addresses, respectively. A circuit portion (e.g. 20) may have a plurality of interfaces (37, 134) which may operate as a slave interface (e.g. 134) or as a master interface (e.g. 37). A same master/slave interface structure and protocol (e.g. 30, 140, 142, 144, 28, 152) may be duplicated and individually configured to be used to communicate among all of the circuit portions (12, 14, 16, 18, 20) within a data processing system (10).

28 Claims, 3 Drawing Sheets

METHOD AND APPARATUS FOR INTERCONNECTING PORTIONS OF CIRCUITRY WITHIN A DATA PROCESSING SYSTEM

FIELD OF THE INVENTION

The present invention relates to a data processing system, and more particularly, a method and apparatus for interconnecting portions of circuitry within a data processing system.

RELATED ART

As data processing systems become more and more complex, the method and apparatus for interconnecting portions of circuitry within the data processing system become more important. If the interconnection topology and protocols are not designed properly, bottlenecks can occur at the interconnection interfaces. Performance of the data processing system can be degraded due to these bottlenecks. It is also important that the interconnect scheme in a data processing system be configurable so that a specific hardware configuration can be used to support a variety of functional configurations.

BRIEF DESCRIPTION OF THE DRAWINGS

The present invention is illustrated by way of example and not limited by the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

As used herein, the term "bus" is used to refer to a plurality of signals or conductors which may be used to transfer one or more various types of information, such as data, addresses, control, or status. The terms "assert" and "negate" is used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Brackets are used to indicate the conductors of a bus or the bit locations of a value. For example, "bus 60 [0–7]" or "conductors [0–7] of bus 60" indicates the eight lower order conductors of bus 60, and "address bits [0–7]" or "ADDRESS [0–7]" indicates the eight lower order bits of an address value.

Figure 1:
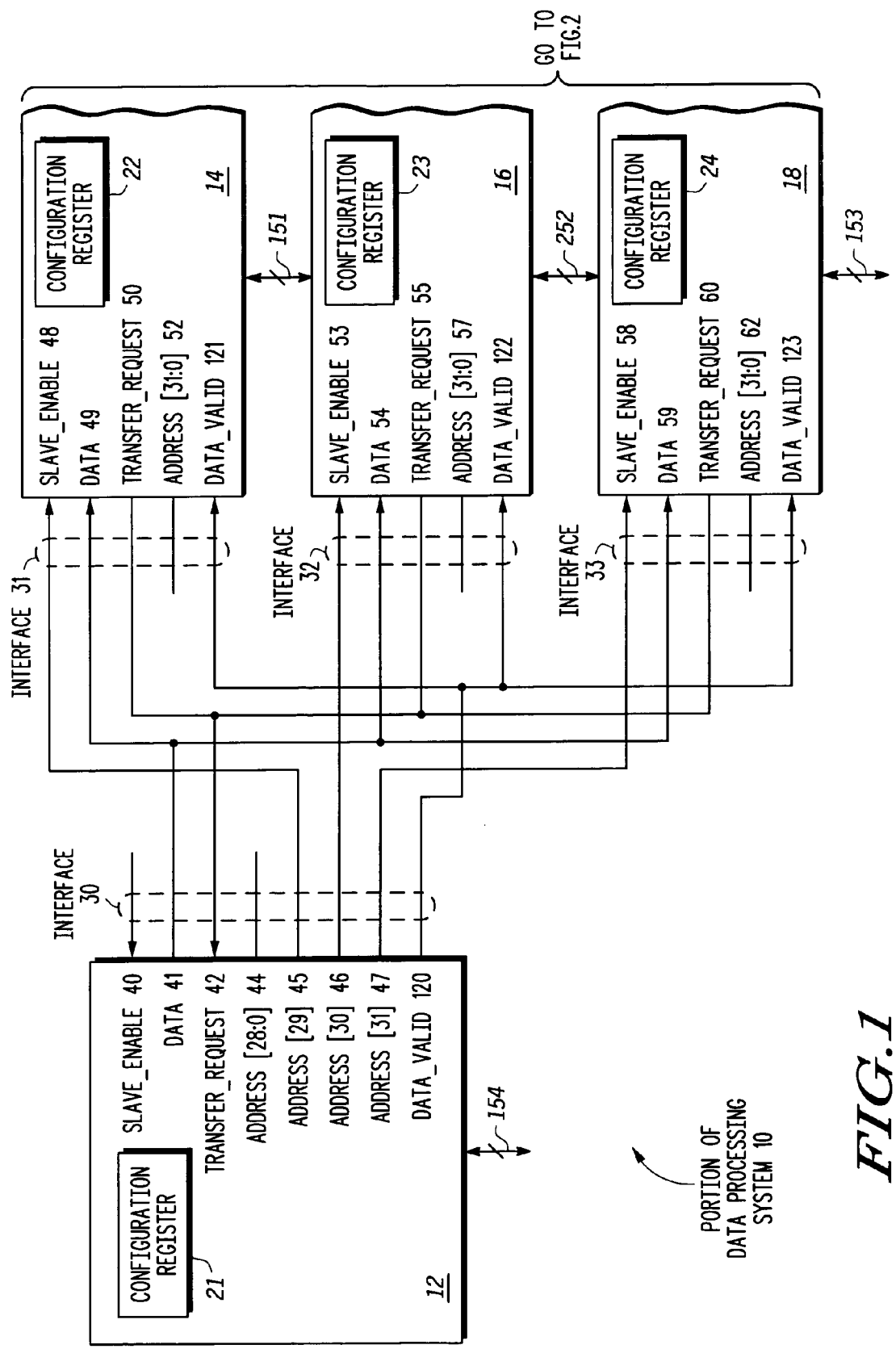
FIG. 1 illustrates, in block diagram form, a portion of data processing system 10 in accordance with one embodiment of the present invention.

FIG. 1 illustrates, in block diagram form, a portion of data processing system 10 in accordance with one embodiment of the present invention. In the illustrated embodiment, data processing system 10 includes a circuit portion 12 having interface 30 which is used to communicate with one or more of circuit portions 14, 16, and 18. Circuit portion 12 also has a configuration register 21. Circuit portion 14 has an interface 31 which is used to communicate with circuit portion 12 by way of interface 30. Circuit portion 14 also has a configuration register 22. Circuit portion 16 has an interface 32 which is used to communicate with circuit portion 12 by way of interface 30. Circuit portion 16 also has a configuration register 23. Circuit portion 18 has an interface 33 which is used to communicate with circuit portion 12 by way of interface 30. Circuit portion 18 also has a configuration register 24.

Circuit portion 12 may include one or more signals 154 which may be used to communicate external to circuit portion 12. For example, signals 154 may be used to write, and thus configure, configuration register 21. Circuit portion 14 may include one or more signals 151 which may be used to communicate external to circuit portion 14. For example, signals 151 may be used to write, and thus configure, configuration register 22. Circuit portion 16 may include one or more signals 152 which may be used to communicate external to circuit portion 16. For example, signals 152 may be used to write, and thus configure, configuration register 23. Circuit portion 18 may include one or more signals 153 which may be used to communicate external to circuit portion 18. For example, signals 153 may be used to write, and thus configure, configuration register 24.

In one embodiment of the present invention, interface 30 includes signals slave_enable 40, data 41, transfer_request 42, address [28:0] 44, address [29] 45, address [30] 46, address [31] 47, and data_valid 120. Interface 31 includes signals slave_enable 48, data 49, transfer_request 50, address [31:0] 52, and data_valid 121. Interface 32 includes signals slave_enable 53, data 54, transfer_request 55, address [31:0] 57, and data_valid 122. Interface 33 includes signals slave_enable 58, data 59, transfer_request 60, address [31:0] 62, and data_valid 123.

Figure 2:
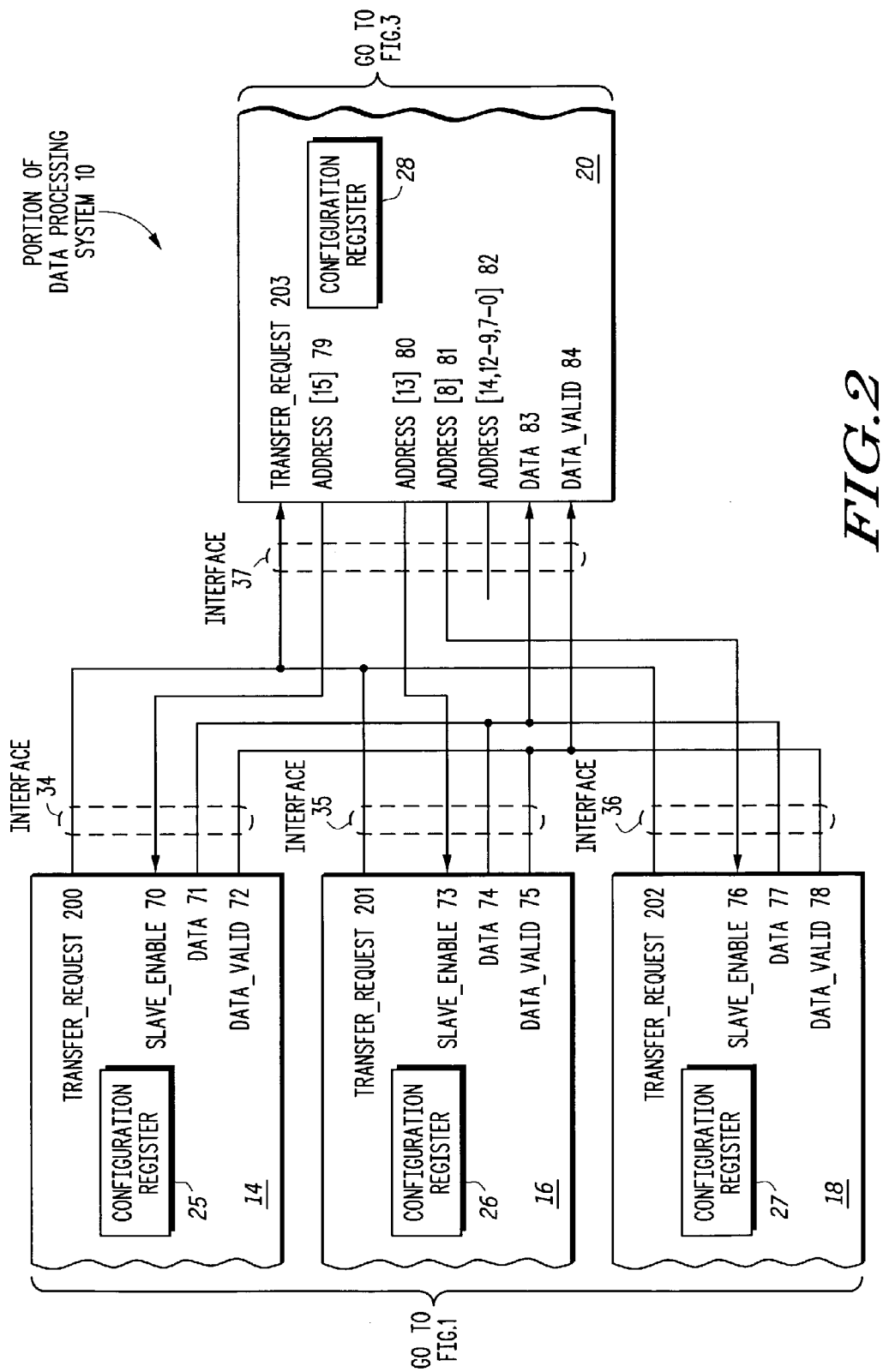
FIG. 2 illustrates, in block diagram form, another portion of the data processing system 10 of FIG. 1 in accordance with one embodiment of the present invention.

FIG. 2 illustrates, in block diagram form, another portion of the data processing system 10 of FIG. 1 in accordance with one embodiment of the present invention. Note that FIG. 2 illustrates a second interface for each one of circuit portions 14, 16, and 18. Circuit portion 14 has a second interface 34 which is used to communicate with circuit portion 20 by way of interface 37. Circuit portion 14 also has a second configuration register 25. Circuit portion 16 has a second interface 35 which is used to communicate with circuit portion 20 by way of interface 37. Circuit portion 16 also has a second configuration register 26. Circuit portion 18 has a second interface 36 which is used to communicate with circuit portion 20 by way of interface 37. Circuit portion 18 also has a second configuration register 27. Note that in alternate embodiments of the present invention, a circuit portion (e.g. 14) that has more than one interface (e.g. 31, 34) may combine the functionality of the configuration registers (e.g. 22, 25) into a single register. This single register may use the same or separate bit fields for each interface (see FIG. 4 for an example of possible bit fields that may be used). Circuit portion 20 has a second interface 134 which may be used to communicate with other circuit portions (not shown). Circuit portion 20 has a configuration register 28. Circuit portion 20 may include one or more signals 150 which may be used to communicate external to circuit portion 20. For example, signals 150 may be used to write, and thus configure, configuration register 28.

In one embodiment of the present invention, interface 34 includes signals transfer_request 200, slave_enable 70, data 71, and data_valid 72; interface 35 includes signals transfer_request 201, slave_enable 73, data 744, and data_valid 75; interface 36 includes signals transfer_request 202, slave_enable 76, data 77, and data_valid 78; and interface 37 includes signals transfer_request 203, address [15] 79, address [13] 80, address [8] 81, address [14, 12–9, 7–0] 82, data 83, and data_valid 84.

Figure 3:
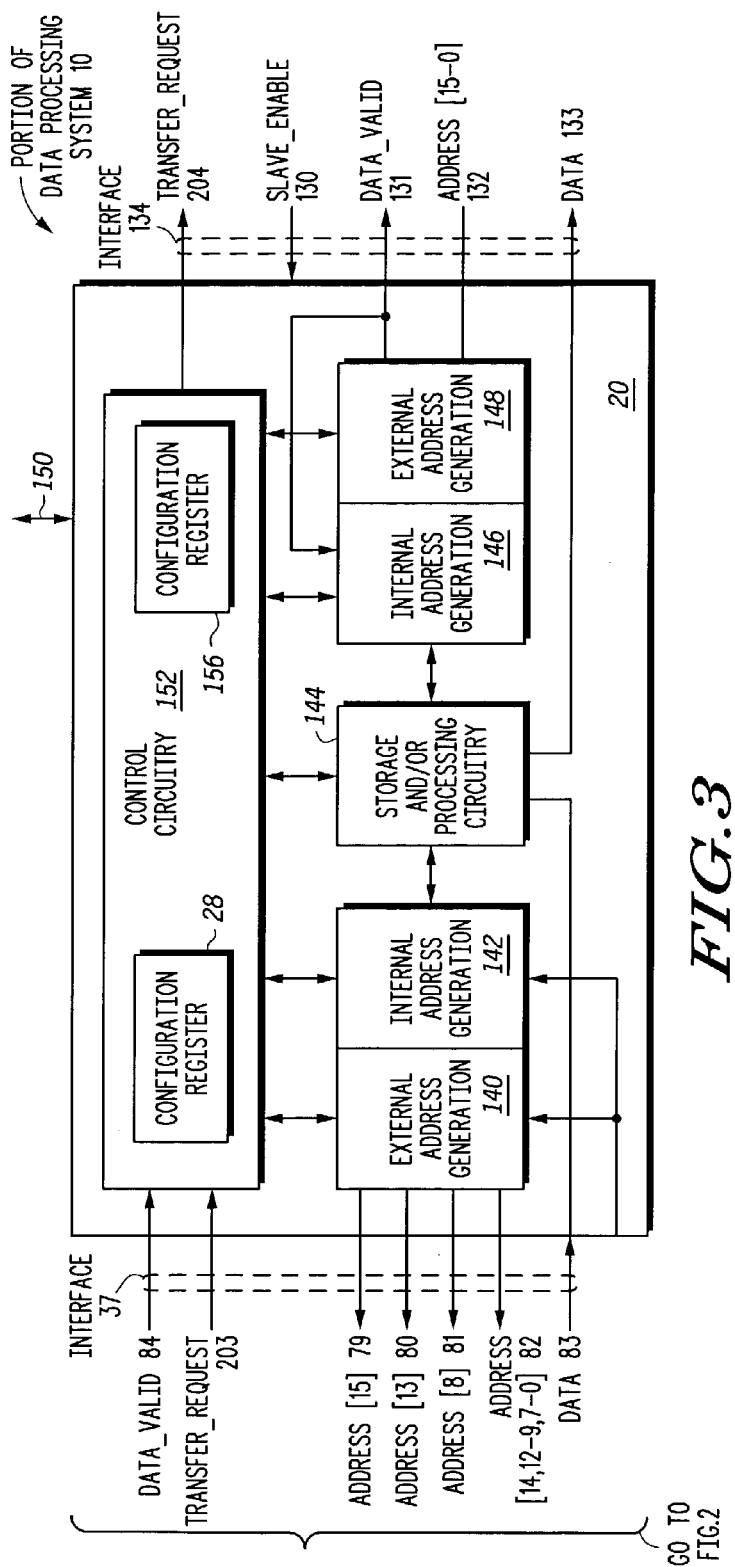
FIG. 3 illustrates, in block diagram form, circuit portion 20 of FIG. 2 in accordance with one embodiment of the present invention.

Note that data processing system 10 may be implemented using any desired circuitry. As possible examples, data processing system 10 may be implemented using one or more integrated circuits, or one or more circuit boards. An interface (e.g. 30–37 and 134) may be implemented on the same integrated circuit as its corresponding circuit portion (e.g. 12, 14, 16, 18, 14, 16, 18, 20, and 20, respectively), or alternately, may be implemented on a different integrated circuit. One possible use for a data processing system 10 as illustrated in FIGS. 2–3 is in an image processing system where data is partitioned into colors (e.g. red, green, blue) by a circuit portion (e.g. 12). Each color is then provided to separate circuit portions (e.g. 14, 16, and 18) for individual storage and/or processing (e.g. by each circuit portion's respective storage and/or processing circuitry 144). The output from the separate circuit portions (e.g. 14, 16, and 18) may then be provided to a common circuit portion (e.g. 20) for output to a printer or computer screen. Note that the present invention may be used for any type of application in which information is transferred between circuit portions. Image processing is just one possible example. Note also that data processing system 10 illustrates only one possible circuit configuration using the present invention. Alternate embodiments of the present invention may couple circuit portions in any desired manner.

FIG. 3 illustrates, in block diagram form, circuit portion 20 of FIG. 2 in accordance with one embodiment of the present invention. In the illustrated embodiment, circuit portion 20 includes external address generation circuitry 140 which is used to generate and provide addresses 79–82 for interface 37. Data valid 84 is provided to control circuitry 152 in order to indicate when data is valid on data 83. Circuit portion 20 includes internal address generation circuitry 142 which is used to generate and provide addresses for internal use by storage and/or processing circuitry 144. Storage and/or control processing circuitry 144 may store and/or processing data received on data signals 83. Storage and/or control processing circuitry 144 is bi-directionally coupled to internal address generation circuitry 142 and to internal address generation circuitry 146. Data may then be output from storage and/or control processing circuitry 144 to data 133.

Note that external address generation circuitry 140 and internal address generation circuitry 142 correspond to and are used with interface 37. Interface 134 also has a corresponding external address generation circuitry 148 and a corresponding internal address generation circuitry 146. Note that control circuitry 152 is bi-directionally coupled to external address generation circuitry 140, internal address generation circuitry 142, storage and/or control processing circuitry 144, external address generation circuitry 148, and internal address generation circuitry 146 to receive and provide status and control information. Control circuitry 152 receives request 203 by way of interface 37, and provides request 204 by way of interface 134. In one embodiment of the present invention, interface 134 includes signals transfer_request 204, slave_enable 130, data 133, address [15:0] 132, and data_valid 131. Alternate embodiments of the present invention may implement circuit portion 20 in any appropriate manner. The block diagram illustrated in FIG. 3 is just one of many possible implementations. Also, although the direction and connection of circuits may vary, the internal blocks illustrated in FIG. 3 for circuit portion 20 may be identical, very similar, or very different for circuit portions 12, 14, 16 and 18 of FIGS. 1–2.

Figure 4:
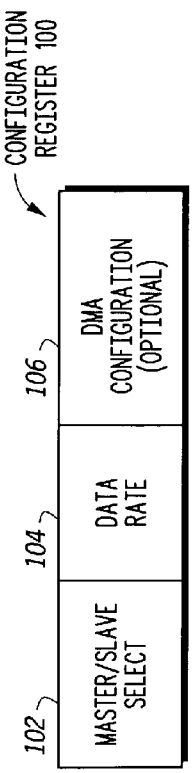
FIG. 4 illustrates, in block diagram form, a configuration register 100 in accordance with one embodiment of the present invention.

FIG. 4 illustrates, in block diagram form, a configuration register 100 in accordance with one embodiment of the present invention. In one embodiment of the present invention, configuration register 100 includes one or more bits forming a master/slave select field 102. Configuration register 100 may also include one or more bits forming a data rate field 104. Optionally, configuration register 100 may include one or more bits forming one or more DMA (Direct Memory Access) configuration fields 106. In one embodiment of the present invention, each one of configuration registers 21–28 and 156 may be implemented using its own copy of configuration register 100. Alternately, each one of configuration registers 21–28 and 156 may be implemented using its own specific combination of register fields, including, but not limited to, the register fields illustrated in FIG. 3.

Operation of data processing system 10 will now be described. Note that in one embodiment of the present invention, a same master/slave interface structure and protocol may be used to communicate among all of the circuit portions 12, 14, 16, 18, and 20. For example, interface 30 of circuit portion 12 may be configured as the master and may provide data to any number of slave interfaces (e.g. 31–33). Optionally, each circuit portion (14, 16, and 18) may then have a second interface which can be independently configured as a master or slave. In the illustrated embodiment, circuit portions 14, 16, and 18 each have a second interface 34–36, respectively, which functions as a slave to provide data to circuit portion 20 by way of interface 37. Note that interface 37 in this configuration is a master interface. In one embodiment of the present invention, the same master/slave interface structure and protocol may be used to communicate in one direction at a time between a single master interface and one or more slave interfaces. Note that for some embodiments of the present invention, software and/or hardware reconfiguration may be required if the direction of data flow is to be changed.

Note that the data processing system 10 of FIGS. 1–3 illustrates a 1 master interface to 3 slave interface (i.e. 1:3) topology for interfaces 30–33, and a 3 slave interface to 1 master interface (i.e. 3:1) topology for interfaces 34–37. In alternate embodiments, any combination of 1:N cascaded interfaces, any combination of N:1 cascaded interfaces, or any combination of 1:N and N:1 cascaded interfaces may be used. In some embodiments of the present invention, the "1" side is always the master and the "N" side is always the slave. Thus, for some embodiments of the present invention, the master/slave interface structure and protocol only allows one master to communicate with N slaves. However, alternate embodiments of the present invention may use an N:M topology or an M:N topology, with either the M or the N side being the master interface.

Note that a circuit portion may have any number of master/slave interface structures, and thus may function as a slave for a first master/slave interface structure and may function as a slave for a second master/slave interface structure. For example, circuit portion 20 (see FIG. 3) has an interface 37 which functions as a master interface when communicating with circuit portions 14, 16, and 18 by way of interfaces 34–36. Circuit portion 20 also has a second interface 134 which is configured as a slave for interfacing to a master interface of another circuit portion (not shown). Note also that the direction of data flow may be from a master to one or more slaves concurrently, or from one slave to the master. Alternate embodiments of the present invention may allow different slaves to be selected by the master concurrently and to provide data to the master concurrently. For example, each of the concurrently selected slaves may provide data on different portions of the data bus (e.g. high and low portions), or may alternately provide data on the same lines if they are wire-ORed.

A sample transfer will now be described using master interface 37 and slave interfaces 34–36 of FIGS. 2–3. Note that the slave_enable input (not shown) of interface 37 is ignored by circuit portion 20 because interface 37 is functioning as a master interface. First, circuit portion 20 generates an external address using external address generation circuitry 140. The generated external address includes address [15] 79, address [13] 80, and address [8] 81 which may be used to select one or more slaves (e.g. circuit portion 14, 16, and 18) via slave_enable 70, 73, and 76, respectively. For this example, it will be assumed that one slave, namely interface 34 of circuit portion 14, has been selected. When interface 34 has data available to send, transfer_request 203 is asserted via transfer_request 200. Interface 34 then provides the data to interface 37 by way of data 71 and data 83, and marks the data valid by asserting data_valid 84 via data_valid 72. The data transfer using interfaces 34–37 has now completed. Interface 37 of circuit portion 20, operating as a master for this data transfer, now generates an internal address using internal address generation circuitry 142. This internal address is then used to store the data received via data 83 in storage and/or processing circuitry 144.

A sample transfer will now be described using master interface 30 and slave interfaces 31–33 of FIG. 1. Note that the slave_enable input 40 of interface 30 is ignored by circuit portion 12 because interface 30 is functioning as a master interface. First, circuit portion 12 generates an internal address using internal address generation circuitry 146. The generated internal address is used to obtain internal data from storage and/or processing circuitry 144. Second, circuit portion 20 generates an external address, using external address generation circuitry 148. The generated external address includes address [31] 47, address [30] 46 and address [29] 45 which may be used to select one or more slaves (e.g. circuit portion 14, 16, 18) via slave_enable 48, 53, and 58, respectively. For this example, it will be assumed that one slave, namely interface 31 of circuit portion 14 has been selected. When interface 31 is available to receive data, transfer_request 42 is asserted via transfer_request 50. Interface 30 then provides the data to interface 31 by way of data 41 and data 49 and marks the data valid by asserting data_valid 121 via data_valid 120. The data transfer using interfaces 30–33 has now completed. Interface 31 of circuit portion 20, operating as a slave for this data transfer, now generates an internal address using internal address generation circuitry 142. This internal address is then used to store the data received via data 49 in storage and/or processing circuitry 144.

How the fields in configuration register 100 (see FIG. 4) affect the operation of interfaces 30–37 and 134 will now be described. Note that in one embodiment of the present invention, each interface 30–37 and 134 has its own configuration register 21–28, respectively. In one embodiment of configuration register 100, master/slave select bits 102 are used to select whether the respective interface 30–37 or 134 operates in a master or slave configuration. Data rate bits 104 may be used to select the operating speed of the respective interface 30–37 or 134. DMA configuration bits 106 may include standard DMA control information, such as for example, source and destination addresses, transfer size, etc. Alternate embodiments of the present invention may use different bit fields to configure interfaces 30–37 and 134. Yet other embodiments of the present invention may use any combination of hardware or software to determine the behavior of interfaces 30–37 and 134, ranging from totally fixed in hardware, to fully software configurable, or any combination in between.

In one embodiment, an integrated circuit comprises: a first interface and a second interface, wherein each of the first and second interface operate according to a same protocol and are capable of operating simultaneously; configuration circuitry coupled to the first and second interface and capable of configuration each of the first and second interfaces as one of a master interface or a slave interface; a plurality of input/output terminals; and multiplexing circuitry coupled to the first and second interface, wherein the multiplexing circuitry selectively communicates signals to or from one of the first and second interface to the plurality of input/output terminals.

In one embodiment, a data processor, comprises: a first interface; configuration circuitry coupled to the first interface and capable of configuring the first interface as one of a master interface or a slave interface; storage circuitry; first address generation circuitry coupled to the first interface, said first address generation circuitry generating an external address when the first interface is configured as a master interface and providing only a portion of said external address via the first interface, wherein the portion of the external address provides a slave enable indicator; and second address generation circuitry coupled to the first external address generation circuitry and to the storage circuitry, said second address generation circuitry generating an internal address for accessing the storage circuitry, wherein the first address generation circuitry operates independently of the second address generation circuitry, and wherein the first address generation circuitry and the second address generation circuitry operate using different clock rates.

In one embodiment, a data processor, comprises: a first interface; configuration circuitry coupled to the first interface and capable of configuring the first interface as one of a master interface or a slave interface; storage circuitry; first address generation circuitry coupled to the first interface, said first address generation circuitry generating an external address when the first interface is configured as a master interface and providing only a portion of said external address via the first interface, wherein the portion of the external address provides a slave enable indicator; and second address generation circuitry coupled to the first external address generation circuitry and to the storage circuitry, said second address generation circuitry generating an internal address for accessing the storage circuitry, wherein the first address generation circuitry operates independently of the second address generation circuitry, and wherein the first address generation circuitry and the second address generation circuitry operate using different data burst sizes.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. An integrated circuit, comprising:
   a first interface and a second interface, wherein each of the first and second interface operate according to a same protocol and are capable of operating simultaneously;
   configuration circuitry coupled to the first and second interface and capable of configuration each of the first and second interfaces as one of a master interface or a slave interface;
   storage circuitry;
   first address generation circuitry coupled to the first interface, said first address generation circuitry generating an external address when the first interface is configured as a master interface, wherein only a portion of the external address is provided via the first interface as a slave enable indicator; and
   second address generation circuitry coupled to the first external address generation circuitry and the storage circuitry, said second address generation circuitry generating an internal address for accessing the storage circuitry.

2. The integrated circuit of claim 1, further comprising:
   third address generation circuitry coupled to the second interface, said third address generation circuitry generating a second external address when the second interface is configured as a master interface, wherein only a portion of the second external address is provided via the second interface as a second slave enable; and
   fourth address generation circuitry coupled to the third external address generation circuitry and the storage circuitry, said fourth address generation circuitry generating a second internal addresses for accessing the storage circuitry.

3. The integrated circuit of claim 1, further comprising:
   processing circuitry, coupled to the storage circuitry, said processing circuitry processing data stored within the storage circuitry.

4. The integrated circuit of claim 1, wherein the first interface comprises a plurality of input/output terminals and the second interface comprises a plurality of input/output terminals.

5. The integrated circuit of claim 1, further comprising:
   a plurality of input/output terminals; and
   multiplexing circuitry coupled to the first and second interface, wherein the multiplexing circuitry selectively communicates signals to or from one of the first and second interface to the plurality of input/output terminals.

6. A data processor, comprising:
   first interface;
   configuration circuitry coupled to the first interface and capable of configuring the first interface as one of a master interface or a slave interface;
   storage circuitry;
   first address generation circuitry coupled to the first interface, said first address generation circuitry generating an external address when the first interface is configured as a master interface and providing only a portion of said external address via the first interface, wherein the portion of the external address provides a slave enable indicator; and
   second address generation circuitry coupled to the first external address generation circuitry and to the storage circuitry, said second address generation circuitry generating an internal address for accessing the storage circuitry.

7. The data processor of claim 6, wherein the external address is independent from the internal address.

8. The data processor of claim 6, wherein the first address generation circuitry operates independently of the second address generation circuitry.

9. The data processor of claim 8, wherein the first address generation circuitry and the second address generation circuitry operate using different clock rates.

10. The data processor of claim 8, wherein the first address generation circuitry and the second address generation circuitry operate using different data burst sizes.

11. An integrated circuit comprising the data processor of claim 6.

12. A data processing system, comprising:
   a first data processor having a first internal address generator and a first interface configured to operate as a master, wherein:
      the first internal address generator generates a first internal address; and
      the first data processor provides data via the first interface corresponding to the first internal address or receives data via the first interface to be stored at the first internal address; and
   a second data processor having a second internal address generator, and a second interface configured to operate as a slave, the second interface directly connected to the first interface, and wherein:
      the second internal address generator generates a second internal address; and
      the second data processor receives data from the first data processor to be stored at the second internal address or provides data stored at the second internal address to the first data processor.

13. The data processing system of claim 12, wherein the first data processor comprises an external address generator which provides a slave enable via the first interface.

14. The data processing system of claim 13, wherein the external address generator generates an external address and provides only a portion of the external address via the first interface, wherein the portion of the external address provides the slave enable.

15. The data processing system of claim 12, wherein the first internal address is independent from the second internal address.

16. The data processing system of claim 12, wherein the first interface comprises a plurality of input/output terminals and the second interface comprises a plurality of input/output terminals.

17. The data processing system of claim 12, further comprising:
a third data processor having second storage circuitry and a third interface configured to operate as a slave, the third interface directly connected to the first interface, wherein:
the third data processor generates a third internal address corresponding to an address within the second storage circuitry; and
the third data processor receives data from the first data processor to be stored at the third internal address or provides the data stored at the third internal address to the first data processor.

18. The data processing system of claim 12, wherein the second data processor further comprises a third interface operating using a same protocol as the first and second interfaces and configured to operate as one of a master or a slave, the data processing system further comprising:
a third data processor having a fourth interface directly connected to the third interface and operating using the same protocol as the first, second, and third interfaces, and
wherein the fourth interface is configured to operate as one of a master or a slave.

19. The data processing system of claim 12, wherein the first data processor comprises a first configuration register, the configuration register providing master/slave configuration information and data rate information corresponding to the first interface, and wherein the second data processor comprises a second configuration register, the second configuration register providing master/slave configuration information and data rate information corresponding to the second interface.

20. An integrated circuit comprising the first and second data processors as claimed in claim 13.

21. A method for communicating data, comprising:
generating an external address and a first internal address within a first data processor;
providing only a portion of the external address from an interface of the first data processor directly to an interface of a second data processor, wherein the portion of the external address provides a slave enable indicator;
based on the slave enable indicator, selectively generating a second internal address within a second data processor, corresponding to storage circuitry within the second data processor; and
based on the slave enable indicator, selectively providing data stored at the second internal address from the interface of the second data processor directly to the interface of the first data processor and storing the data in the first data processor at the first internal address.

22. The method of claim 21, further comprising:
providing only a second portion of the external address from the interface of the first data processor directly to an interface of a third data processor, wherein the second portion of the external address provides a second slave enable indicator; and
based on the second slave enable indicator, selectively generating a third internal address within a third data processor, corresponding to storage circuitry within the third data processor; and
based on the slave enable indicator, selectively providing data stored at the third internal address from the interface of the third data processor directly to the interface of the first data processor and storing the data in the first data processor at the first internal address.

23. The method of claim 21, further comprising:
based on the slave enable indicator, selectively providing a transfer request to the first data processor, prior to providing data stored at the second internal address.

24. The method of claim 21, wherein a remaining portion of the external address is not provided by the first data processor to the second data processor.

25. A method for communication data, comprising:
generating an external address and a first internal address within a first data processor;
providing only a portion of the external address via an interface of the first data processor, wherein the portion of the external address provides a slave enable indicator;
providing data stored at the first internal address via an interface of the first circuit portion;
based on the slave enable indicator, selectively generating a second internal address within a second data processor, corresponding to storage circuitry within the second circuit portion; and
based on the slave enable indicator, selectively receiving the data stored at the first internal address at an interface of the second circuit portion, directly from the interface of the first data processor and storing the received data within the storage circuitry of the second data processor at the second internal address.

26. The method of claim 25, further comprising:
providing only a second portion of the external address from the interface of the first data processor directly to an interface of a third data processor, wherein the second portion of the external address provides a second slave enable indicator; and
based on the second slave enable indicator, selectively generating a third internal address within a third data processor, corresponding to storage circuitry within the third data processor; and
based on the slave enable indicator, selectively receiving the data stored at the first internal address at an interface of the third circuit portion, directly from the interface of the first data processor and storing the received data within the storage circuitry of the third data processor at the third internal address.

27. The method of claim 25, further comprising:
based on the slave enable indicator, selectively providing a transfer request to the first data processor, prior to receiving data stored at the first internal address.

28. The method of claim 25, wherein a remaining portion of the external address is not provided from the first data processor to the second data processor.

* * * * *